United States Patent [19]

Caswell

[11] Patent Number: 4,819,744

[45] Date of Patent: Apr. 11, 1989

[54] FUNNEL HOLE ICE AUGER

[76] Inventor: Ty J. Caswell, Rte. 1, Box 351, Zimmerman, Minn. 55398

[21] Appl. No.: 182,875

[22] Filed: Apr. 18, 1988

[51] Int. Cl.$^4$ ............... F25C 5/04; E21B 10/32; E21B 17/07

[52] U.S. Cl. .................. 175/18; 175/53; 175/265; 175/285; 175/286; 175/321; 175/323; 175/384; 175/386

[58] Field of Search ........... 175/18, 384, 394, 406, 175/392, 385, 321, 386, 284–288, 388, 327, 323, 97, 98, 230, 263, 265–268, 289, 270, 53; 405/237

[56] References Cited

U.S. PATENT DOCUMENTS

| | | | |
|---|---|---|---|
| 774,051 | 11/1904 | Driskill | 175/392 X |
| 1,406,348 | 2/1922 | Corrigan | 175/286 X |
| 1,561,523 | 11/1925 | Riedle . | |
| 1,710,998 | 4/1929 | Rudkin | 175/285 |
| 1,970,063 | 8/1934 | Steinman | 255/74 |
| 2,301,478 | 11/1942 | Tibbals, Jr. et al. | 175/18 |
| 2,401,250 | 5/1946 | Kandle | 175/384 X |
| 3,299,970 | 1/1967 | Anderson | 175/18 |
| 3,336,989 | 8/1967 | Henderson | 175/18 |
| 3,397,750 | 8/1968 | Wicklund | 175/18 |
| 3,731,751 | 5/1973 | Rusco | 175/18 X |
| 3,749,184 | 7/1973 | Andeen | 175/18 |

FOREIGN PATENT DOCUMENTS

| | | | |
|---|---|---|---|
| 185277 | 9/1966 | U.S.S.R. | 175/285 |
| 726321 | 4/1980 | U.S.S.R. | 175/323 |

*Primary Examiner*—Hoang C. Dang
*Attorney, Agent, or Firm*—Kinney & Lange

[57] ABSTRACT

An ice auger includes a pair of ice boring blades fixedly attached to the bottom of a straight inner auger drive bar. A brace and bit arrangement at the top of the drive bar is for rotating the drive bar and either forcing it down toward the ice to bore a cylindrical hole of predetermined diameter through the ice or to force it up away from the ice after the hole has been bored to ream out a portion of that hole to form an inverted funnel shape opening. A tubular outer sleeve surrounds the drive bar and is movable between an upper boring condition and a lower reaming condition with respect to the drive bar. Two slotted longitudinally extending ice reaming blades are pivotally mounted at their top portions to the ream control sleeve. A reaming blade camming support bar attached to a bottom portion of the drive bar carries camming pins slidable in the reaming blade slots. These reaming blades move between position inside the predetermined diameter and partially outside of it with movement of the sleeve along the drive bar.

11 Claims, 4 Drawing Sheets

FUNNEL HOLE ICE AUGER

BACKGROUND OF THE INVENTION

1. Field of the Invention

This invention has relation to augers used by ice fisherman and more particularly to augers useful to both bore a cylindrical hole of predetermined diameter through the ice on a lake and to ream out a bottom portion of that hole to form an inverted funnel shape opening to greatly facilitate the landing of hooked fish through the ice.

2. Description of the Prior Art

It is known to use augers to bore holes through ice extending over bodies of water to form what is known as ice fishing holes. There are a very large number of such augers in existence today. For example, U.S. Pat. No. 2,301,478 granted to Tibbals, Jr. et al in November of 1942 shows a hollow cylindrical cutting element 17 which is rotated and forced downwardly into the ice, cutting the ice with V-shaped cutting teeth 19. In this type of boring device, a solid core of ice is formed which is lifted out after the boring tool or cutting element 17 has cut clear through the ice layer.

A perhaps more usual structure is, however, one where a pair of substantially horizontally positioned boring blades at the end of an upright drive shank are rotated by manual or power means to cut down through the ice in a manner similar to the manner in which an old-fashioned, hand-operated brace and bit bores a hole through wood, where the hole being bored through the wood is one inch or more in diameter.

After a cylindrical hole is bored through the ice, it is known to provide a separate tool having retracted blades which can be lowered down through the cylindrical hole and then extended outwardly past the side walls of the cylindrical hole at an acute angle to the axis of the hole. These blades are then forced up against the bottom of the hole and rotated to form an inverted funnel-like bottom opening to the ice fishing hole. The following U.S. patents show such structures: U.S. Pat. Nos. 3,299,970 granted to Anderson in Jan. 24, 1967; 3,336,989 granted to Henderson in August of 1967; 3,397,750 granted to Wicklund in August of 1968; and 3,749,184 granted to Andeen in July of 1973.

All of these cited patents show structure designed to overcome the difficulties encountered when a straight-sided cylindrical hole is used as an ice fishing hole. In landing either a small or a large fish through such a straight cylindrical hole after the fish is hooked on the fisherman's line, the line must often take on a substantially right angle bend over the jagged edge of the ice at the bottom of the cylindrical cut. Also, even if the line does not break under this strain and rough action, when the head of the hooked fish comes up against the solid flat ice surface adjacent the hole, this shock can often break the line. When the head does hit the ice in that manner, the fisherman must relax the tension on the line instantaneously to allow the head to move into alignment with the cylindrical hole before again pulling on the line. This instantaneous release pressure will, many times, result in the fish being able to "throw" the bait hook from its mouth, or this lack of pressure on the line will allow the hook to otherwise become disengaged.

While each of these patents showing structure for obtaining an inverted funnel-shape opening demonstrates a clear need for the production of such an opening by the ice fisherman, every one of them presupposes that the cylindrical, vertical-sided hole through the ice is drilled or bored by a separate ice auger before the reaming tool is inserted through the hole.

In the patent to Anderson, '970, at column 1, beginning on line 23, it is stated that an "object of the invention is to provide means for lowering and lifting ice cutting equipment into a pre-cut small ice hole, and for providing actual cutting of the lower edges of the pre-cut ice hole by lifting up on the cutting means and thus reaming the ice by turning the handle of the upper end thereof."

In the patent to Henderson, '989, in column 1, beginning on line 43, it is pointed out that the ice cutting tool of that invention "provides a simplified means of tapering or flaring the bottom surface of the [cylindrical] hole to facilitate movement of the fish as it is brought to the surface of the water and prevent the hook from being dislodged." This is illustrated in FIG. 2 of that patent.

In the patent to Wicklund, '750, at column 1, beginning on line 29, it is provided that the "invention comprises two embodiments of ice trimming devices for chamfering the lower end of a precut ice fishing hole whereby the sharp hidden lower edge of the hole will be eliminated and fish may be easily drawn upward through the hole."

The Andeen patent, '184, states at column 1, beginning on line 3, that the "present invention is directed to the art of ice fishing and is more specifically directed to a tool for use in flaring the lower portions of a hole cut through the ice. As is well known in the art of ice fishing, a straight cylindrical hole extending through the ice tends to pose problems to the ice fisherman in that when fish are caught, the line must in many instances be drawn in by the ice fisherman so that a right angle turn must be negotiated by the fish as it is pulled from the water out onto the surface of the ice." In FIG. 3 of the Andeen patent, an ice cutting tool 32 is shown affixed to the bottom of the ice flaring tool and is designed to be screwed into position and held into place by a set screw 33 which is seen in FIG. 1. However, it is to be noted that there is no cooperation between the ice cutting tool 32 for cutting the cylindrical hole through the ice and the ice flaring mechanism. In fact, the specification of the Andeen patent provides at column 2, beginning on line 60: "As is illustrated in FIG. 3, opening 31 may be utilized to hold an ice cutting tool 32 of conventional spoon type for drilling the initial cylindrical hole through the surface of the ice. It is desirable to have ice hole drilling tool 32 removable from the overall assembly after completion of the initial drilling operation as it merely adds unnecessary weight for subsequent flaring of the lower side of the hole produced by the ice tool spoon 32."

Other structures which include flaring tools or reamers or the like for undercutting post holes already drilled in the earth include the following U.S. patents: U.S. Pat. Nos. 1,561,523 granted to Riedle in November of 1925; 1,970,063 granted to Steinman in August of 1934. Here again, these structures are designed for use in post holes or the like which have already been drilled by another instrument.

In the Riedle Patent '523, it is stated at page 1, beginning on line 92, that the "ends of the cutter bars 1 are inserted into sockets 21 and the machine is lowered into a previously bored hole; . . . " In the Steinman Patent '063, it is stated at page 1, beginning at line 1 that the "invention relates to underreamers for enlarging the bottom portion of holes made in the ground for the reception of piers or the like thereby increasing the bearing surface with a minimum excavation of earth."

The patents cited above were all located by a skilled patent searcher working with an early form of the present invention. That searcher also cited U.S. Pat. No. 2,301,478; but it is not believed to be pertinent to the present invention. Neither the inventor nor those in privity with him are aware of any closer prior art than that discussed above and are aware of no prior art which anticipates the claims set out herein.

What was needed before the present invention was a compact, easily "knocked down" and easily reassembled device which an ice fishmerman could carry from his home to the fishing place conveniently, and which was capable of both boring a cylindrical hole of predetermined diameter entirely through the ice and then reaming out the bottom portion of that hole to form an inverted funnel shape opening through which hooked fish can easily be drawn.

SUMMARY OF THE INVENTION

This invention presents in a single tool, an ice auger for boring a cylindrical ice fishing hole through ice into water and for reaming a bottom portion of that hole to form an inverted funnel shape opening to facilitate removal of a hooked fish through the hole. Several elements of the structure of the invention cooperate to serve both the initial boring function and the subsequent reaming function.

The ice auger of the invention includes a straight inner drive bar, ice boring blade means fixedly attached to a bottom portion of the drive bar, the boring blade means being operative upon rotation and forcing down of the drive bar toward the ice to bore a cylindrical hole of predetermined diameter into and through the ice. The auger also includes means attached to a top portion of the drive bar for rotating the drive bar and selectively either forcing it down toward the ice for boring a cylindrical hole through the ice or forcing it up away from the ice for reaming the inverted funnel shape hole to replace a portion of the bored cylindrical hole. Also included is a tubular outer ream control sleeve in concentric, surrounding, longitudinally sliding and fixed angular or rotational relation to the inner drive bar. The sleeve is movable between a first upper, boring, condition and a second, lower, reaming condition with respect to the drive bar.

Releasable means is provided to retain the ream control sleeve selectively in either its first condition or its second condition. At least two longitudinally extending ice reaming blades are each pivotally attached at top portions thereof with respect to a bottom portion of the ream control sleeve and each such blade has a longitudinally extending positioning slot extending over a substantial portion of its length.

A reaming blade slide bar is integrally attached to a bottom portion of the drive bar and extends outwardly therefrom to have outer end portions aligned with the reaming blade slots. At least two reaming blade camming pins extend outwardly from the slide bar end portions, each pin to be in sliding relation to one of the reaming blade slots.

Means is provided to move the sleeve between (a) its first condition wherein the camming pins lie in lower ends of the reaming blade slots to retain the reaming blades within the predetermined diameter of the bored ice hole; and (b) its second condition wherein the camming pins have moved up these slots forcing at least lower portions of the reaming blades to position outside of the predetermined diameter of the bored hole.

The reaming blades are operative when positioned below a bored hole with the ream control sleeve in its second position and upon rotation and forcing up of the drive bar to ream a portion of the bored cylindrical hole to have an inverted funnel shape.

DETAILED DESCRIPTION OF THE PREFERRED EMBODIMENT

An ice auger 10 is for boring a cylindrical hole 12 through a layer of ice 14 lying over a body of water 16; and, when such cylindrical hole has been bored, for reaming a bottom portion of that hole to form an inverted funnel shape opening 18 consisting of a reamed portion 19 and the wall of the cylindrical hole 12.

Once such an inverted funnel shape opening 18 has been formed, the fisherman will introduce his bait, hook and line through this opening. When a fish, either large or small, takes the bait and is hooked, the fisherman will have to withdraw the fish from the water through this opening. Because the sharp edge of the bottom of the ice hole initially formed when the cylindrical hole was first bored in the ice has been eliminated, the strain on the fishline coming around at a 90° corner has been eliminated. Perhaps more importantly, the head of the fish will be easily started into the funnel shape hole so that the fish can be withdrawn from the water without pulling free of the hook. Because tension can be maintained on the line at this critical point, the fish cannot "throw" the hook from its mouth by violent head motions as are usual at this point.

The ice auger 10 includes a straight inner drive bar 20 having a lower portion 21 and an upper portion 22. This upper portion has an internally threaded (not specifically shown) bottom end 23 adapted, when the ice auger is completely assembled, to have received an externally threaded top end 24 of the lower drive bar portion 21. Together the upper and lower portions form the complete straight inner drive bar 20.

Extending integrally upwardly from the upper end of the straight upper portion 22 of the drive bar 20 is a handle assembly 26 including a crank arm 27 forming a brace 28. Rotatably mounted on the offset portion of the brace is a drive handle 30, while a downward and upward force receiving guide pad 32 is rotatably mounted at the top of the crank arm.

Figure 3:
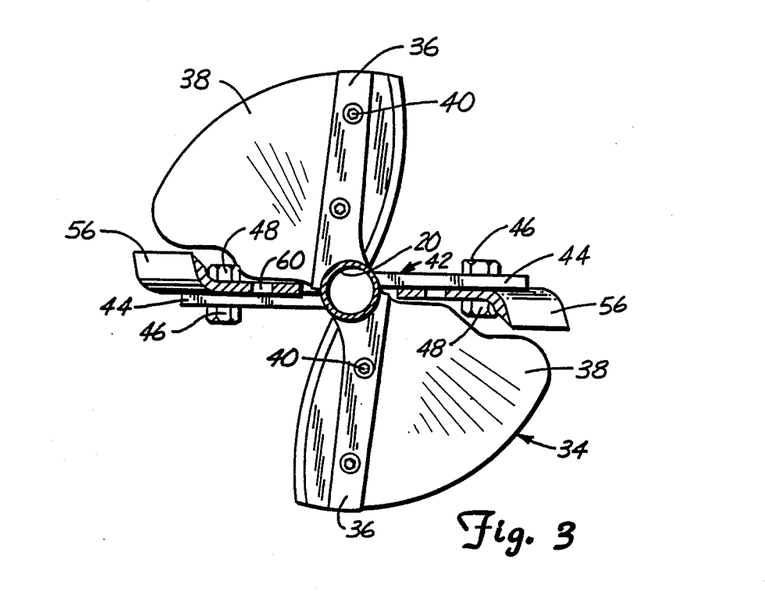
FIG. 3 is an enlarged horizontal sectional view taken on the line 3—3 in FIG. 1 showing the parts in the first condition for boring a hole through ice.

Ice boring blade means 34 are fixedly attached to a bottom portion of the drive bar, and, as perhaps best seen in FIG. 3, include, in the form of the invention as shown, a flat, steel, boring blade support bar 36 made integral with the bottom end of the drive bar 20 as by welding for example. This bar 36 extends outwardly in two opposite directions from the longitudinal axis of the boring bar. A pair of ice boring blades 38,38 are replaceably mounted with respect to the boring blade support bar 36 by cap screws, nuts and bolts, or other metallic fasteners 40.

Ice reaming blade camming means 42 also extends outwardly from the bottom end of the inner drive bar 20. This camming means 42 includes, as perhaps best seen in FIGS. 1, 3 and 5, a camming support bar 44. It also includes ice reaming blade camming pins 46,46 and camming pin nuts 48,48. The purpose of this camming means 42 will become clear as the specification proceeds.

Figure 4:
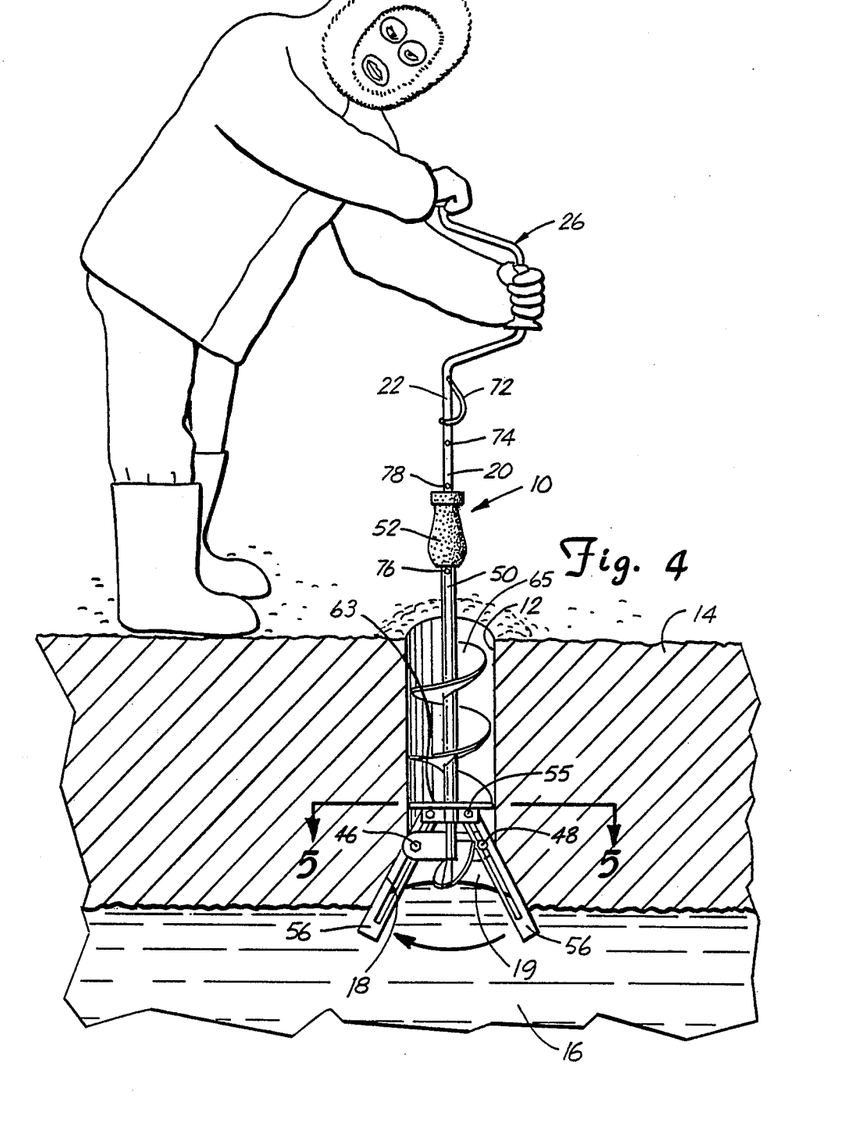
FIG. 4 is a side elevational view of the entire assembled auger, but with the parts in a second condition for reaming a bottom portion of the cylindrical bored hole to form an inverted funnel shape opening in the ice.
Figure 5:
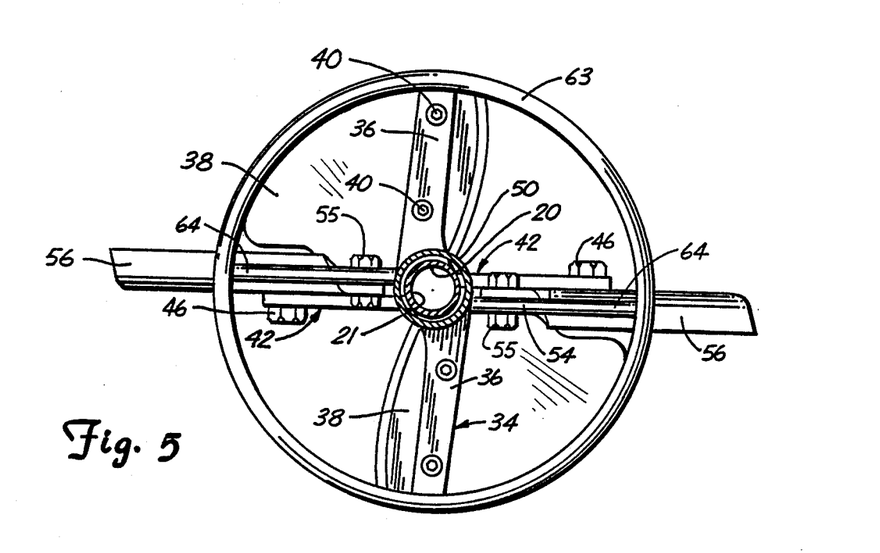
FIG. 5 is an enlarged horizontal sectional view of the auger parts taken on the line 5—5 in FIG. 4, but with the representation of the ice omitted.

A tubular outer ream control sleeve 50 is in sliding, concentric, surrounding relation to the drive bar 20. While freely slidable for limited distances up and down the drive bar, it is fixed against angular or rotational movement with respect to the drive bar. It is movable with respect to the drive bar 20 from a first, upper, boring condition as seen in FIGS. 1, 2 and 3 and a second, lower, reaming condition as seen in FIGS. 4 and 5.

In the form of the invention as shown, this ream control sleeve 50 is provided with a ream control sleeve handle 52 at its uppermost end, and with ice reaming blade pivot bars 54 extending in opposite directions outwardly from and welded to its bottom end. A pair of longitudinally extending ice reaming blades 56,56 are each pivotally attached by reaming blade pivot pins and nuts as at 55 to outer ends of the ice reaming blade pivot bar means 54. Each such reaming blade 56 is provided with a longitudinally extending positioning slot or track 60. Ice reaming camming pins 46 are encompassed by slots 60 and camming pin nuts 48,48 (or other appropriate fasteners) are threaded onto these pins 46 to keep them confined in these slots.

Figure 1:
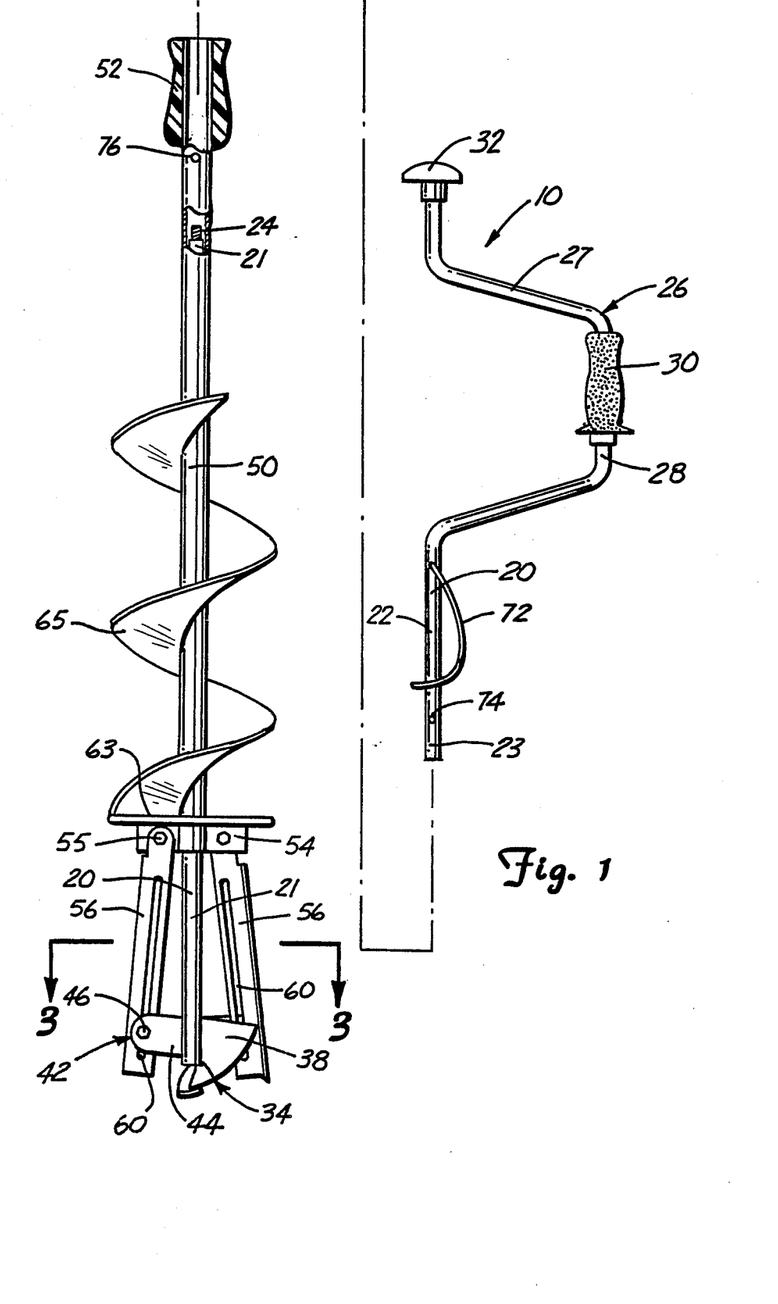
FIG. 1 is an exploded side elevational view of an ice auger made according to the invention with parts in section and parts broken away, with a handle assembly shown removed from the remainder of the auger.
Figure 2:
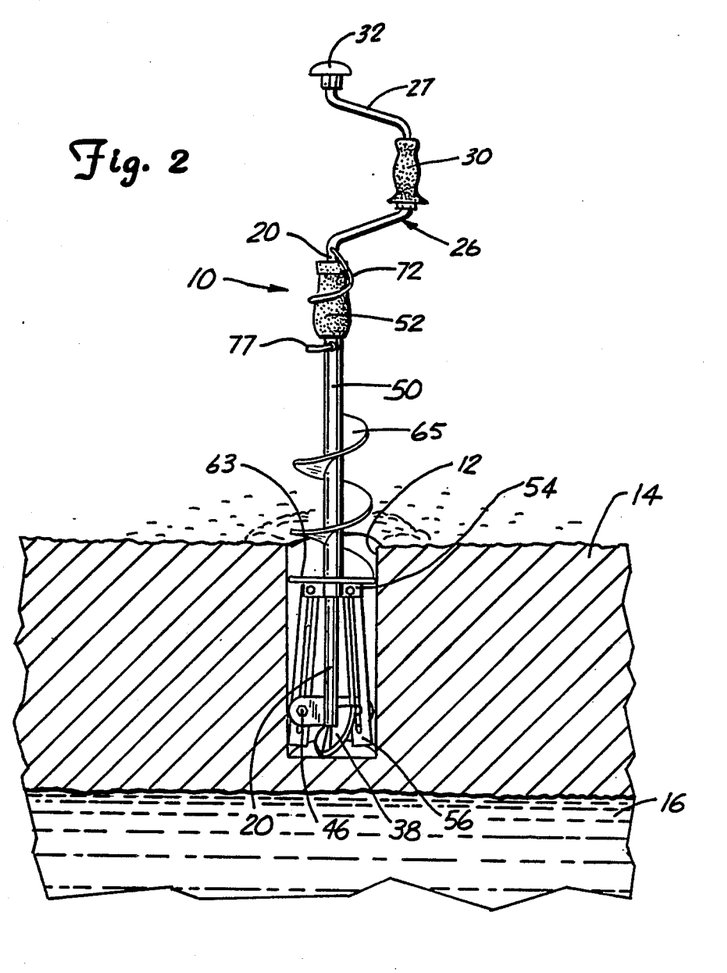
FIG. 2 is a side elevational view of the completely assembled auger of FIG. 1 shown in a first condition for boring a hole through ice and into a body of water lying below.

The alignment and configuration of the parts is such that, when the outer ream control sleeve 50 and the inner drive bar 20 are in their first condition with respect to each other, as seen in FIGS. 1, 2, and 3, these slots 60 and pins 46 will position the cce reaming blades 56 within the diameter of any cylindrical hole 12 bored by ice boring blades 38.

Also extending outwardly from the outer ream control sleeve 50 along with the ice reaming blade pivot bars 54 is a cylindrical ream alignment ring 63. This ring has an outside diameter approximately the same as the diameter of the cylindrical hole 18 bored by the ice boring blades 38,38. Ring 63 is supported by arms 64 integral with and extending outwardly from the ice reaming blade pivot bars 54.

Extending upwardly from one of these arms 64 is an elongate spiral auger blade 65, the outside edges of which define a cylindrical surface of roughly the same diameter as that of the bored cylindrical hole 12. Inner edges of this auger blade 65 are integrally fastened, as by welding, to the ream control sleeve 50.

This auger blade 65 has several functions.

First, when the cylindrical hole 12 is being bored, once the hole gets deep enough to receive a portion of the auger blade, the ice chips formed by the boring will begin to be lifted up out of the hole 12 and deposited around the outer edge of the hole. During this process, outer edges of the blade are confined by the edges of hole 12 to insure vertical alignment of the auger.

Further, when the reaming process begins, ream alignment ring, riding inside of the bottom of the cylindrical hole 12, will keep the reaming blades 56 properly aligned in the center of the cylindrical bored hole. The spiral auger blade 65 will, however, ride on the sides of this cylindrical opening 12 and will insure that the entire drive bar and control sleeve are kept in the center of the bored hole, preventing wobble while reaming by making the alignment of the reaming blades even more precise.

When the hole 16 is first bored through the ice 14, water 16 will tend to flow up into the bored hole to seek approximately the same level as the top of the ice. Auguer blade 65, therefore, will continue to serve the purpose of tending to move ice chips freed by reaming from clogging the hole and will tend to bring these ice chips up onto the surface of the ice.

In order to bore a cylindrical hole 12 through the ice, it is necessary that the tubular outer ream control sleeve 50 be maintained in its first condition with respect to the drive bar 20. For this purpose, a spring clip 72 is pivotally mounted to the upper end of the upper portion 22 of the drive bar, and this spring clip is of configuration to snap over the ream control sleeve handle 52 to retain the control sleeve 50 in its first condition. Other means could, of course, be employed to retain the ream control sleeve 50 in its first condition. For example, a first drive bar keeper opening 74 can be drilled in drive bar 20; and a corresponding first control sleeve keeper opening 76 can be drilled in the sleeve 50. Then with the parts positioned as seen in FIG. 2, a narrow elongate keeper 77 can be inserted through the openings 74 and 76 to positively retain the sleeve 50 in its first condition with respect to the drive bar 20.

OPERATION

Upon arrival at a preferred fishing spot on an ice covered lake, the ice fisherman will assemble the parts of the auger 20 as seen in FIG. 1 by aligning the upper portion 22 of the straight inner drive bar 20 with its lower portion 21, and rotating that upper portion and the handle assembly 26 until the internally threaded bottom end 23 of upper portion 22 is screwed firmly onto the externally threaded top end 24 of the lower portion 21.

The parts will now be positioned as seen FIG. 2, and the fisherman can exert a downward pressure on the guide pad 32 while rotating the crank arm 27, brace 28 and drive handle 30 in a clockwise direction in the form of the invention as shown. This will cause the ice boring blade means 34 to bore a cylindrical hole 12 into the ice as seen in FIG. 2 and, finally, down through the ice leaving a right angle between the bottom surface of the ice and the vertical side wall of the cylindrical hole 12.

Releasing the clip 72 or removing the elongated keeper 77, the fisherman can use the ream control sleeve handle 52 and the guide pad 32 to move the sleeve 50 from its first condition to its second condition. With the ice reaming blade pivot bar 54 below the bottom of the cylindrical opening, this movement will cause the camming support bar 44 to move upwardly with respect to the ice reaming blade pivot bar 54. The ice reaming blade camming pins 46, riding in the longitudinally extending slots 60 of the ice reaming blades 56, will then necessarily force lower portions of those blades 56 to a position aligned outside of the vertical cylindrical surface of the bored cylindrical hole 12.

By rotating the handle 30 of the handle assembly 26 while lifting upwardly on the guide pad 32, the fisherman can now ream out the bottom portion of the cylindrical opening 12 to form the inverted funnel shape opening 18 including the reamed portion 19 referred to above.

The camming pins 46 have centers on a diameter larger than the diameter of the centers of the reaming blade pivot pins 55. It has been found that because of this angular relationship, upward force on the handle assembly and therefore on the drive bar 20 will, in and of itself, prevent the control sleeve 50 from moving out of its second condition as long as such upper pressure is applied while rotating the drive bar and, consequently, the ice reaming blades 56,56. However, a further positive means of fixing the control sleeve in its second condition can be to have drilled a second drive bar keeper opening 78 through the drive bar 20 and, once the control sleeve 50 has been moved to its second condition, to position the parts as seen in FIGS. 4 and 5, the elongate keeper 77 can be inserted in the drive bar keeper opening 78, and will be long enough to prevent the top end of the control sleeve 50 from moving out of its second condition.

Once the inverted funnel shape opening 18 has been formed, the elongate keeper 77, if used, will be removed from the second drive bar keeper opening 78, the ream control sleeve handle 52 and the handle assembly 26 will be used to move the sleeve 50 to its first condition where it will be fastened to position the parts as seen in FIGS. 1, 2 and 3, and the ice auger 10 will be removed from the inverted funnel shape opening 18 including now the reamed portion 19 and the remainder of the cylindrical hole 12. The fisherman can then proceed to bait his hook and drop it and the attached line into the opening with the assurance that there will be much less chance for any fish hooked to be lost because of dislodging the hook or breaking the line due to the shape of the ice fishing hole.

As shown, at least the lower portion 21 of the straight inner drive bar 20 is hollow, except for the externally threaded top end 24 thereof. This hollow structure is desirable in that it does tend to reduce the weight of the overall auger.

As stated above, the sleeve 50 slides from first condition to second condition freely on the drive bar 20, but cannot rotate to change angular or rotational position with respect to that drive bar. This is so in the case of the structure shown herein because of the relationship of the ice reaming blade pivot bars 54 firmly pivotally mounted with respect to the bottom end of the sleeve 50, reaming blade pivot pins 55, the longitudinally extending ice reaming blades 56, the ice reaming blade camming pins 46 riding in the slots 60 of the ice reaming blades, and the camming support bar 44 integrally mounted to the drive bar 20.

Other means can be employed to keep the sleeve 50 from changing angular or rotational position with respect to the drive bar. For example, each could be made square or some other noncircular shape in transverse cross section.

The camming action of the reaming blades 56 has been shown to be accomplished using elongated slots in the reaming blades and using ice reaming blade camming pins riding in those slots, these camming pins 46 being at the ends of camming support bar 44. However, other elongated tracks can be provided on the reaming blades, and carriages other than camming pins could be mounted to the outer ends of the camming support bar 44 to ride in such tracks.

Although the present invention has been described with reference to preferred embodiments, workers skilled in the art will recognize that changes may be made in form and detail without departing from the spirit and scope of the invention.

What is claimed is:

1. An ice auger for boring a cyclindrical ice fishing hole through ice into water and for reaming a bottom portion of the hole to form an inverted funnel shape opening to facilitate removal of a hooked fish through the hole, said ice auger including:

(a) a straight inner drive bar;

(b) means attached to a top portion of the drive bar for rotating the drive bar and for selectively either forcing it down toward the ice for boring a cylindrical hole through the ice or forcing it up away from the ice for reaming an inverted funnel shape hole to replace a portion of the bored cylindrical hole;

(c) ice boring blade means permanently attached to a bottom portion of the drive bar, said boring blade means being operative upon rotation and forcing down of the drive bar to bore a cylindrical hole of predetermined diameter into and through the ice;

(d) a tubular outer ream control sleeve in concentric, surrounding, longitudinally sliding relation and fixed angular relation with respect to said inner drive bar, said sleeve being movable between a first, upper, boring condition, and a second, lower, reaming condition with respect to the drive bar;

(e) releasable means to retain said ream control sleeve selectively in either its first condition or its second condition;

(f) at least two longitudinally extending ice reaming blades, each pivotally attached at a top portion thereof with respect to a bottom portion of the ream control sleeve to have a pivot point at less radial distance from the longitudinal axis of the drive bar than the predetermined radius determined by the boring blade means, and each blade having a longitudinally extending positioning track extending over a substantial portion of its length;

(g) reaming blade camming support bar means integrally attached to a bottom portion of the drive bar to be in horizontal alignment with said boring blade means, the support bar means extending radially outwardly from the drive bar to have at least two outer end portions aligned with said reaming blade tracks;

(h) at least two reaming blade camming carriages extending outwardly from said camming support bar end portions, each carriage to be in tracking relation to one of said reaming blade tracks, said carriages each being spaced at a greater radial distance from the drive bar axis than the top pivot point of its associated ice reaming blade;

(i) means to move sleeve between said first condition wherein said camming carriages lie in lower ends of said reaming blade tracks to retain said reaming blades within the predetermined diameter of a bored ice hole and said second condition wherein said camming carriages have moved up said tracks forcing at least lower portions of said reaming blades to position outside of said predetermined diameter of the bored hole; and (j) wherein said reaming blades are operative when positioned below a cylindrical hole bored through the ice with the sleeve in its second condition and upon rotation and forcing up of said drive bar to ream a portion of said bored cylindrical hole to have an inverted funnel shape.

2. The ice auger of claim 1 wherein:

(k) means is provided to tend to maintain concentric alignment of the auger drive bar and the sleeve with respect to a bored cylindrical hole during the reaming operation of the auger in that hole, and tend to maintain concentric alignment of the auger drive bar and sleeve with respect to the board cylindrical hole during later stages of the boring operation;

(l) said alignment means includes a cylindrical ream alignment ring having substantially the same outer diameter as the predetermined diameter of the bored hold, said ring being fixedly positioned in concentric relation to the ream control sleeve by radial bars extending outwardly from that sleeve in adjacent relation to the points of pivotal connection of the upper end portions of the reaming blades with respect to the sleeve.

3. The ice auger of claim 2 wherein:

(m) said alignment means also includes a spiral auger blade extending integrally outwardly from the sleeve and upwardly of the alignment ring, the outer diameter of the auger blade being substantially the same as the predetermined diameter of the bored hole.

4. In an ice auger including:

(i) a straight inner drive bar, (ii) means attached to a top portion of the drive bar for rotating the drive bar and forcing it down toward the ice, and (iii) ice boring blade means permanently attached to a bottom portion of the drive bar, said boring means being operative upon rotation and forcing down of the drive bar to bore a cylindrical hole of predetermined diameter into and through the ice;

the improvement wherein;

(a) a tubular outer ream control sleeve is provided in concentric, surrounding relation to the inner drive bar to be freely slidable longitudinally on the drive bard but to be fixed against angular, rotational movement with respect to it, said sleeve being movable between a first, upper, boring condition, and a second, lower, reaming condition with respect to the drive bar;

(b) releasable means is provided to retain said ream control sleeve selectively in either its first condition or its second condition;

(c) at least two longitudinally extending ice reaming blades are provided each pivotally attached at a top portion thereof with respect to a bottom portion of the ream control sleeve and each having a longitudinally extending positioning slot extending over a substantial portion of its length;

(d) ice reaming blade camming support bar means is integrally attached at a bottom portion of the drive bar to be in horizontal alignment with said boring blade means, said support bar means extending radially outwardly from the drive bar to have outer end portions generally aligned with said reaming blade slots;

(e) reaming blade camming pins extend outwardly from each said reaming blade camming support bar means end portions to be in sliding relation to each of said reaming blade slots;

(f) means is provided to move said sleeve between said first condition wherein said pivot pins lie in lower ends of said reaming blade slots to retain said reaming blades within the predetermined diameter of an ice hole bored by said boring blade means and said second condition wherein said pins have moved up said slots forcing at least lower portions of said reaming blades to position outside said predetermined diameter of the bored hole; and (g) means operative on the drive bar is provided to force it up away from the ice as the drive bar is rotated with the sleeve in its second condition and the reaming blades are below the ice to ream a portion of said bored cylindrical hole to have an inverted funnel shape.

5. The ice auger of claim 4 wherein:

(h) means is provided to tend to maintain concentric alignment of the auger drive bar and sleeve with respect to a bored cylindrical hole during the reaming operation of the auger.

6. The ice auger of claim 5 wherein:

(i) said alignment means includes a cylindrical ream alignment ring having substantially the same outer diameter as the predetermined diameter of the bored hole, said alignment ring being fixedly positioned in concentric relation to the ream control sleeve by radial bars extending outwardly from that sleeve in adjacent relation to the points of pivotal connection of the upper end portions of the reaming blades with respect to the sleeve.

7. The ice auger of claim 6 wherein:

(j) said alignment also includes a spiral auger blade extending integrally outwardly from the sleeve and upwardly from the alignment ring, the outer diameter of the auger blade being substantially the same as the predetermined diameter of the bored hole.

8. In an ice auger including:

(i) a straight inner drive bar, (ii) means attached to a top portion of the drive bar for rotating the drive bar and forcing it down toward the ice, (iii) ice boring blade means permanently attached to a bottom portion of the drive bar, said boring blade means being operative upon rotation and forcing down of the drive bar to bore a cylindrical hole of predetermined diameter into and through the ice, and (iv) a spiral auger blade having an axis coincident with the longitudinal axis of the drive bar and extending outwardly away from the drive bar and upwardly from a position above the ice boring blade means to a position below the means for rotating the drive bar and forcing it down toward the ice;

the improvement wherein:

(a) a tubular outer ream control sleeve is provided in concentric, surrounding relation to the inner drive bar to be freely slidable longitudinally on the drive bar but to be fixed against angular, rotational movement with respect to it, said sleeve being movable between a first, upper, boring condition and a second, lower, reaming condition with respect to the drive bar;

(b) releasable means is provided to retain said ream control sleeve selectively in either its first condition or its second condition;

(c) at least two longitudinally extending ice reaming blades are provided each pivotally attached at a top portion thereof with respect to a bottom portion of the ream control sleeve at a pivot point spaced from the drive bar axis at a radial distance less than the predetermined radius determined by the boring blade means, and each such blade having a longitudinally extending positioning slot extending over a substantial portion of its length;

(d) reaming blade camming support bar means is integrally attached with respect to a bottom portion of the drive bar to be in horizontal alignment with said boring blade means, said support bar means extending radially outwardly from the drive bar to have at least two outer end portions generally aligned with said reaming blade slots;

(e) reaming blade camming pins extend outwardly from each said slide bar end portion to be in sliding relation to each of said reaming blade slots, said camming pins each being spaced at a greater radial distance from the longitudinal axis of the drive bar than the top pivot point of its associated ice reaming blade;

(f) means is provided to move said sleeve between said first condition wherein said pivot pins lie in lower ends of said reaming blade slots to retain said reaming blades within the predetermined diameter of an ice hole bored by said boring blade means and said second condition wherein said pins have moved up said slots forcing at least lower portions of said reaming blades to position outside said predetermined diameter of the bored holes;

(g) said spiral auger blade extends integrally outwardly from said sleeve; and (h) means operative on the drive bar is provided to force it up away from the ice as the drive bar is rotated with the slide bar in its second condition and the reaming blades are below the ice to ream a portion of said bored cylindrical hole to have an inverted funnel shape.

9. The ice auger of claim 8 wherein:

(i) means is provided to tend to maintain concentric alignment of the auger drive bar and sleeve with respect to the bord cylindrical hole during the reaming operation of the auger, and to tend to maintain concentric alignment of the auger drive bar and sleeve with respect to the bored cylindrical hole during later stages of the boring operation.

10. The ice auger of claim 9 wherein:

(j) said alignment means includes the spiral auger blade extending integrally outwardly from the longitudinal axis of the sleeve and includes a cylindrical alignment ring having substantially the same outer diameter as the predetermined diameter of the bored hole, said alignment ring being fixedly positioned in concentric relation to the ream control sleeve by radial bars extending outwardly from that sleeve in adjacent relation to the points of pivotal connection of the upper end portions of the reaming blades with respect to the sleeve; and (k) the spiral auger blade extends upwardly from position adjacent the alignment ring.

11. An ice auger for boring a cylindrical ice fishing hole through ice into water and for reaming a bottom portion of the hole to form an inverted funnel shape opening to facilitate removal of a hooked fish through the hole, said ice auger including:

(a) a straight inner drive bar;

(b) means attached to a top portion of the drive bar for rotating the drive bar and for selectively either forcing it down toward the ice for boring a cylindrical hole through the ice or forcing it up away from the ice for reaming an inverted funnel shape hole to replace a portion of the bored cylindrical hole;

(c) ice boring blade means permanently attached to a bottom portion of the drive bar, said boring blade means being operative upon rotation and forcing down of the drive bar to bore a cylindrical hole of predetermined diameter into and through the ice;

(d) a tubular outer ream control sleeve in concentric, surrounding, longitudinally sliding relation and fixed annular relation with respect to said inner drive bar, said sleeve being movable between a first, upper, boring condition, and a second, lower, reaming condition with respect to the drive bar;

(e) releasable means to retain said ream control sleeve selectively in either its first condition or its second condition;

(f) at least two longitudinally extending ice reaming blades, each pivotally attached at a top portion thereof with respect to a bottom portion of the ream control sleeve to have a pivot point at less radial distance from the longitudinal axis of the drive bar than the predetermined radius determined by the boring blade means, and each blade having a longitudinally extending positioning track extending over a substantial portion of its length;

(g) reaming blade camming support bar means integrally attached to a bottom portion of the drive bar to be in horizontal alignment with said boring blade means, the support bar means extending radially outwardly from the drive bar to have at least two outer end portions aligned with said reaming blade tracks;

(h) at least two reaming blade camming carriages extending outwardly from said camming support bar end portions, each carriage to be in tracking relation to one of said reaming blade tracks, said carriages each being spaced at a greater radial distance from the drive bar axis than the top pivot point of its associated ice reaming blade;

(i) means to move said sleeve between said first condition wherein said camming carriages lie in lower ends of said reaming blade tracks to retain said reaming blades within the predetermined diameter of a bored ice hole and said second condition wherein said camming carriages have moved up said tracks forcing at least lower portions of said reaming blades to position outside of said predetermined diameter of the bored hole;

(j) wherein said reaming blades are operative when positioned below a cylindrical hole bored through the ice with the sleeve in its second condition and upon rotation and forcing up of said drive bar to ream a portion of said bored cylindrical hole to have an inverted funnel shape; and (k) means to tend to remove ice chips floating upwardly during the operation of the ice boring blade means to bore a cylindrical hole, said chip removing means including a spiral auger blade extending integrally outwardly from the ream control sleeve.

* * * * *

UNITED STATES PATENT AND TRADEMARK OFFICE
CERTIFICATE OF CORRECTION

PATENT NO. : 4,819,744

DATED : April 11, 1989

INVENTOR(S) : Ty J. Caswell

It is certified that error appears in the above-identified patent and that said Letters Patent is hereby corrected as shown below:

Column 8, line 12, delete "cyclindrical", insert --cylindrical--.

Column 8, line 62, after "move", insert "said".

Column 9, line 15, delete "board", insert --bored--.

Column 9, line 21, delete "hold", insert --hole--.

Column 9, line 48, delete "bard", insert --bar--.

Column 11, line 47, delete "bord", insert --bored--.

Signed and Sealed this

Nineteenth Day of November, 1991

Attest:

HARRY F. MANBECK, JR.

Attesting Officer

Commissioner of Patents and Trademarks